Dec. 22, 1959
L. PENSAK
2,918,600
STORAGE TUBE
Original Filed Aug. 17, 1953
2 Sheets-Sheet 1
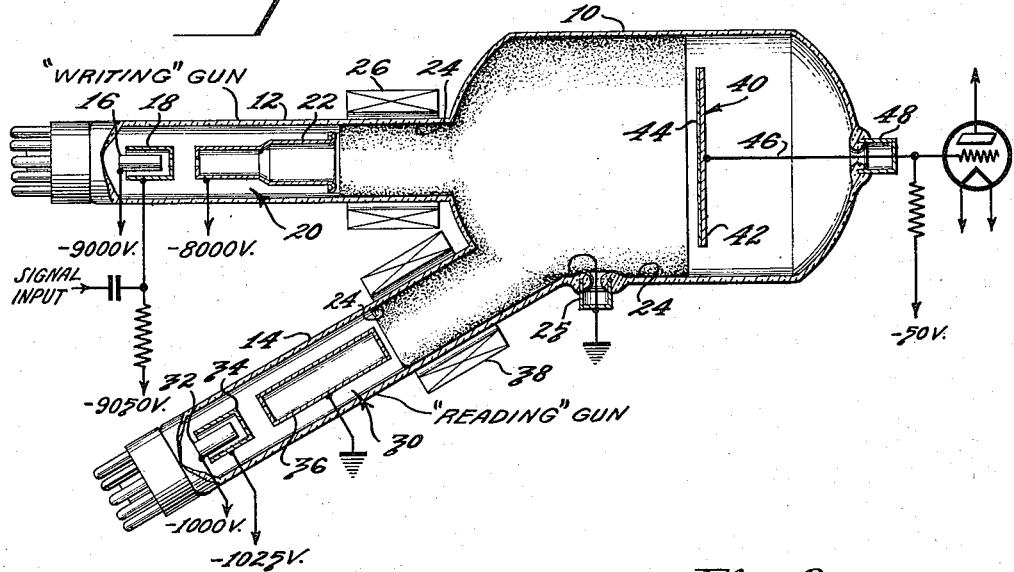
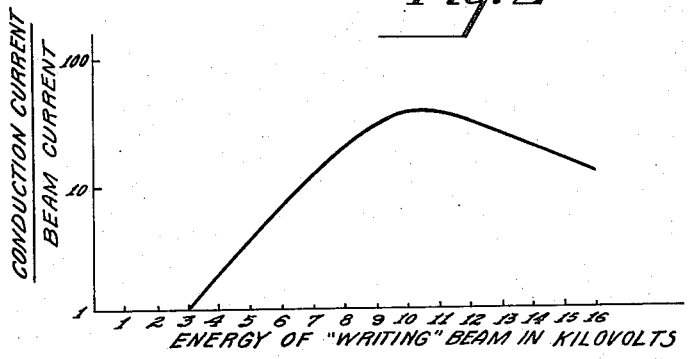
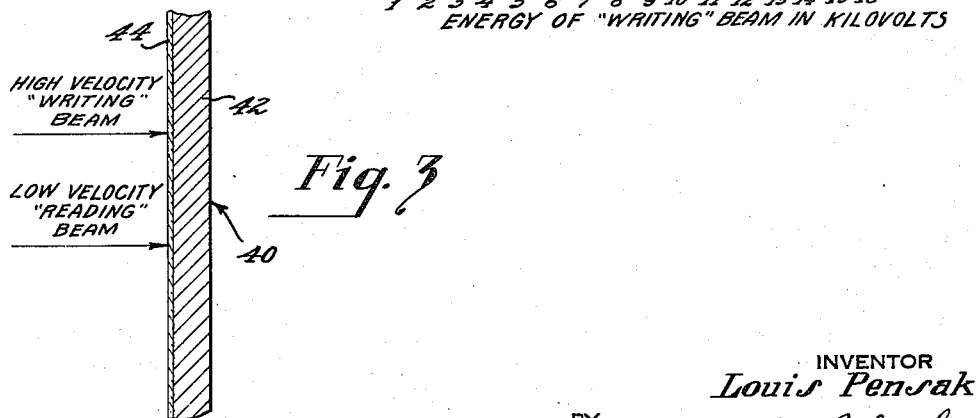
INVENTOR
Louis Pensak
BY
William A. Pensak
ATTORNEY

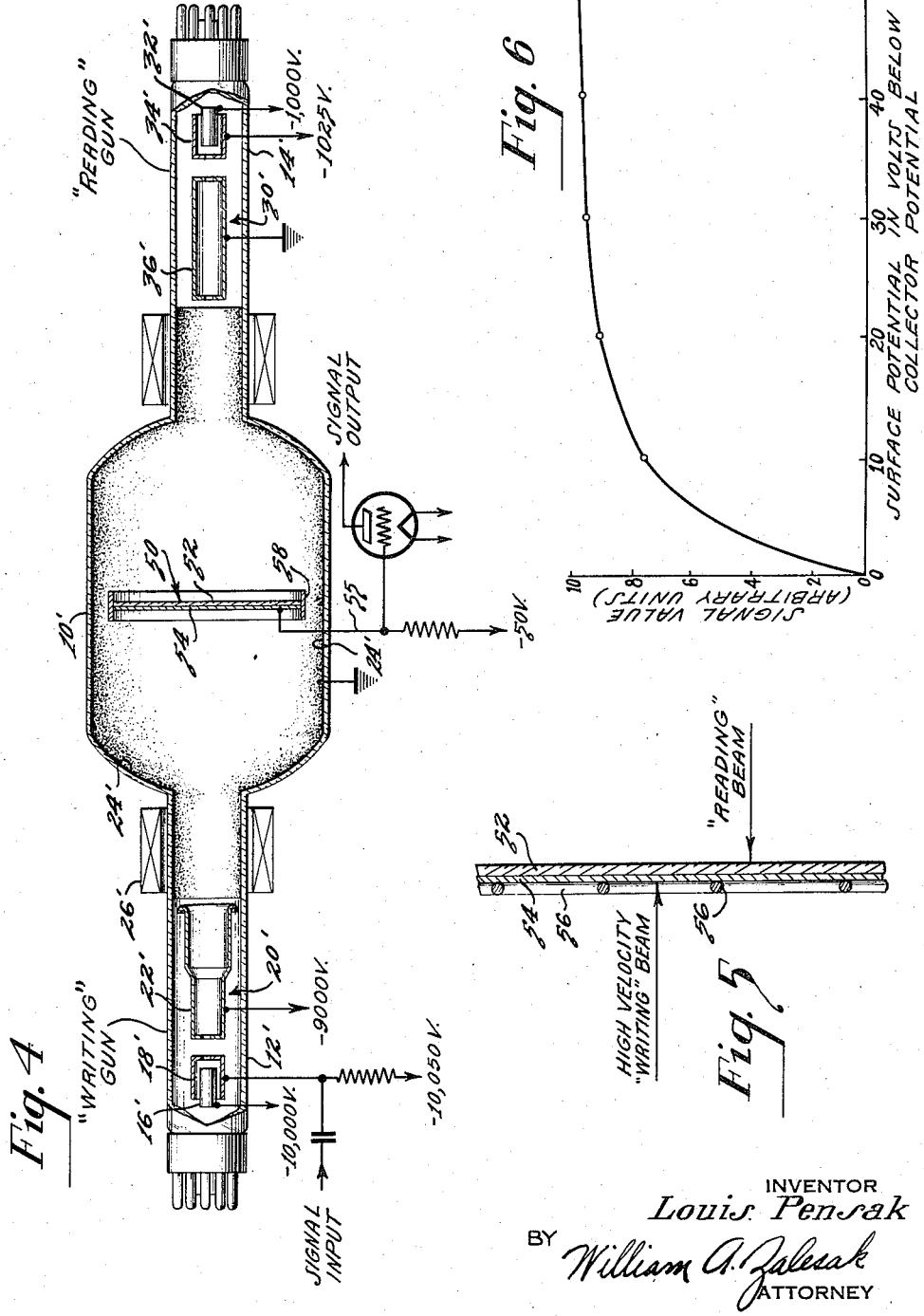

United States Patent Office 2,918,600
Patented Dec. 22, 1959

2,918,600

STORAGE TUBE

Louis Pensak, Princeton, N.J., assignor to Radio Corporation of America, a corporation of Delaware Continuation of application Serial No. 374,478, August 17, 1953. This application July 29, 1957, Serial No. 674,929

25 Claims. (Cl. 315—8.6)

This is a continuation of the copending application, Serial No. 374,478, filed August 17, 1953, now abandoned.

There is a growing number of devices using radar of the plan position indicator (P.P.I.) type in conjunction with other systems, such as television, in order to combine the advantages of both. For example, very large radar patterns can be obtained by converting the radar to television signals which can then operate a theatre type television projection system. Or, in the teleran system, it is highly desirable to broadcast a television picture of the necessary radar information.

There is a problem, therefore, of obtaining a means of converting radar signals to television signals without loss of the pattern geometry. This implies storage of the radar signals for at least several seconds, as it can take this long to complete one P.P.I. pattern. Also, because television pictures are generated at the rate of thirty per second, it may be necessary to generate several hundred television copies of a radar pattern before it fades out. Such conversion of signals has already been obtained by using a television pick-up tube with a reflection type optical system to pick up the relatively weak afterglow of a radar cathode ray tube with a long persistent fluorescent screen. Much better results have been obtained with a special, high capacity television camera tube picking up the initial flash of a cathode ray tube without any afterglow, the picture being stored by the photocathode of the camera tube. Both these schemes require a high brightness cathode ray tube and an optical system to link the two electrical signals.

One type of storage tube utilizing an all-electronic conversion of one type of radar signals can be regarded as a kinescope and iconoscope in one bulb, with the mosaic replaced by a charge sensitive, insulator storage target. The kinescope gun or "writing" gun takes the radar signal and "writes" it on the target. The iconoscope gun or "reading" gun generates the television signal and gradually removes the stored signals from the target electrode.

Such types of storage tubes use a high velocity "writing" beam, having electrons accelerated to velocities beyond the second cross-over, where the secondary electron emission is less than the primary electron beam, in order to lay down a negative signal pattern on the insulator target surface. Yet, since the secondary emission ratio is above zero, only a portion of the "writing" beam current is useful in discharging an elemental target area and so the beam currents required are greater than if the total beam current was useful. When the "writing" speed of the high velocity beam is high, the signal charge put down on the target can only be obtained by high instantaneous current values in the beam. If at the same time, a pattern of high resolution is desired, that is, that the focused beam spot be as sharp as possible, then some compromise is necessary between focused spot size and beam current, as it is impossible to increase the current in a beam beyond certain limiting values without increasing the size of the focused spot.

Such types of storage tubes, in which two electron beams of different electron velocities are caused to scan over a dielectric target surface, also depend for successful operation upon the charge pattern established upon the dielectric surface. This charge pattern is established by the two electron scanning beams, each initiating a secondary electron emission having a different emission ratio. Due to conditions, such as for example, redistribution of electrons back on the target surfaces, the charge pattern stored on the dielectric surface frequently does not have the desired difference in potential between elemental areas of the pattern. This results in low signal values and poor picture resolution.

It is therefore an object of this invention to provide a cathode ray storage tube of improved operation.

It is also an object of this invention to provide a cathode ray storage tube having a target of improved storage characteristics.

It is also an object of this invention to provide a cathode ray storage tube having an improved resolution of the charge pattern.

It is a further object of this invention to provide a cathode ray storage tube having a storage electrode capable of receiving a signal of high resolution at a high "writing" speed.

In the course of a series of experiments on the electrical properties of some non-crystalline dielectric insulating materials, I discovered that, when sufficiently thin films of such non-crystalline insulating materials are penetrated by a high velocity electron beam, these thin films temporarily became conductive at the region of penetration of the beam through the film. This conduction effect is more than a mere penetration of the beam current through the insulating film, as I have noted, a simultaneous current flow through the film up to two hundred times that of the bombarding beam current. The insulating film was observed to recover its insulating properties after removal of the impinging electron beam.

I have designed a storage tube having an insulating target in which is utilized this conduction effect found in non-crystalline insulating materials under electron bombardment. The storage tube comprises a target electrode having a conductive signal plate and a thin film of non-crystalline insulating material in contact with the signal plate. The insulating target surface is maintained at collector potential by the secondary emission effect of a scanning, low velocity electron "reading" beam, whereas the conductive signal plate is held at a different potential. The insulating surface is discharged to the potential of the signal plate by the scanning of a high velocity "writing" beam which penetrates the insulating film at desired points to produce a charge pattern by the conduction effect. The signal is produced when the low velocity beam restores the charge pattern to the original equilibrium potential.

The utilizing of this conductive effect of non-crystalline insulating films in this manner in a storage tube has several distinct advantages. The stability of operation of the tube is improved by establishing the potential of the signal plate as a new type of eqilibrium potential. This is not possible with a non-conductive target surface, whose surface potentials are determined by secondary emission only. This new tube also permits the use of a smaller "writing" beam current than would be required by a surface depending on secondary emission effects alone. The charged up dielectric film is here discharged by a conduction current that can be over a hundred times the original "writing" beam current. This is greatly in excess of effects depending upon secondary emission alone.

The novel features which I believe to be characteristic of my invention are set forth with particularity in the appended claims, but the invention itself will best be understood by reference to the following description taken in connection with the accompanying drawings, in which:

Figure 1 is a view in section of a discharge tube according to my invention.

Figure 2 is a graphical representation of the conduction effect utilized by my invention.

Figure 3 is a partial view in section of the target structure of the tube of Figure 1.

Figure 4 is a view in section of a modification of the discharge tube according to my invention.

Figure 5 is a partial view in section of a target structure according to a modification.

Figure 6 shows the relationship between the operating potential of the target surface of the tube of Figure 1 to the output signal value of the tube.

The tube of Figure 1 comprises a tubular envelope 10 having an extension 12 mounted coaxially with the envelope portion 10 and a second tubular extension 14 mounted with its axis at an angle to that of the envelope 10. Coaxially mounted within the tubular extension 12 is an electron gun of conventional design comprising a cathode 16, a control grid 18, and a focusing and accelerating tubular anode electrode 22. Mounted within the other tubular extension 14 is a second electron gun structure 30 including a cathode cylinder 32, control grid 34 and accelerating and focusing electrode 36 arranged coaxially with each other. A wall coating 24 provides a second anode electrode common to the two electron guns 20 and 30. A target electrode 40 is mounted within the tubular envelope portion 10 intercepting at its center the axis of gun 20 at right angles and the axis of gun 30 at an angle. The target electrode is formed from a heavy metal signal plate 42, which also functions as the target support, and a dielectric or insulating layer 44 covering the face of the signal plate 42 facing the two electron guns. A lead 46 extends between the signal plate 42 and an external terminal 48 for connecting the target electrode into an external circuit. A neck yoke 26 surrounds the tubular extension 12 adjacent the envelope portion 10 and a second neck yoke 38 surrounds extension 14. Neck yoke 26 and 38 comprise one or more magnetic coils for providing the desired type of beam deflection for the electron gun 20.

One specific form of the tube of Figure 1, made in accordance with my invention, is operated in such a manner that a high velocity electron beam is produced by the electron gun 20 and strikes the dielectric surface 44 of target 40 at around nine thousand volts. The target electrode 40 is of such construction, as is described below, that the electron beam of gun 20 will produce a negative charge on the dielectric surface wherever it strikes. The electron beam produced by the gun 30 will strike the target 40 at a much lower velocity at around one thousand volts.

Incoming signals, as from a radar receiver, are applied on the control electrode 18 of the electron gun 20, which is referred to as the "writing" gun. The scanning fields produced by the yoke 26 may be of any desired type. If tube 10 is used in a radar application, of a P.P.I. type, the fields of yoke 26 may provide a line scansion on the target surface 44, which is rotated about the center of the target 40 in synchronism with the rotating antenna of the radar receiver. The beam of electron gun 30, referred to as a "reading" gun, is caused to scan the target 40 by fields produced by the deflection yoke 38, as is common in television pick-up tubes. The deflection yoke 38 may comprise two pairs of deflection coils connected to a suitable source (not shown), such as saw-tooth generators for providing magnetic fields perpendicular to each other and to the axis of the gun 30 for scanning the target electrode 40. It is understood, however, that appropriate magnetic or electrostatic deflection means may be substituted for the deflection coils of yokes 26 and 38 for providing different types of scansion of the target 40, all of which are well known in the art and need not be further described.

The continuous scanning of the target electrode 40 by the "reading" gun 30 will produce a secondary electron emission from the dielectric surface 44 and tend to raise the potential of surface 44 to that of the conductive coating 24, which acts as a collector electrode for the secondary emission. In the specific tube described, the negative signal plate 42 is maintained during tube operation at 50 volts negative, relative to the collector electrode 24. A negative charge pattern is put down by the "writing" gun 20 on the dielectric surface 44 of the target, corresponding to the radar signals applied on the control grid 18. As the electron beam of the "reading" gun 30 continuously scans the target surface 44 the negative charge patterns are removed by the beam of gun 30 to produce signal pulses in the output circuit of signal plate 42.

In the investigation of the properties of thin films of silica, a hitherto unreported effect was discovered. I have found that when a silica film was completely penetrated by an electron beam, the silica layer becomes conductive. If the silica was deposited upon a metal base plate mounted in a tube similar to that of Figure 1, and if the metal plate was held at a specific potential, it was found that the exposed surface of the silica penetrated by a high velocity electron beam would go to the potential of the supporting metal base plate. This effect would occur whether the base plate was positive or negative, with respect to the collector electrode. The fact that the silica surface would also go to the positive potential of the base plate, in spite of a beam striking the surface above second cross-over potential, at which the secondary emission ratio is less than one, and which therefore would tend to drive the surface negative, indicated that currents were flowing through the silica layer in excess of the secondary emission effects. The silica layer was found to recover its full insulation properties on the removal of the penetrating beam.

A study of this conduction effect indicates that the conduction of thin dielectric layers depends on the absorption of the "writing" beam energy in the dielectric film and also requires that the "writing" beam penetrate through the dielectric film. A theory which tends to explain this phenomenon is that the electrons of the beam absorbed by the dielectric film tend to release or free a greater number of electrons inside the dielectric material. If there is a difference of potential between the two surfaces of the dielectric film, there will be a current flow of these free electrons through the film.

Figure 2 shows a typical curve of this conductive effect. In Figure 2, the vertical axis represents the ratio of the conduction current through a particular dielectric film of silica, having a thickness of about 5000 Angstroms, to the beam current of the penetrating electron beam. The horizontal axis represents the voltage of the beam striking the dielectric film. For this particular film it is seen that the conduction effect begins to occur at close to three thousand volts energy of the striking electron beam. At this point some electrons penetrate through the dielectric material. The conduction of the film increases as the energy of the electron beam increases, to around nine thousand volts. At this beam energy, the greatest fraction of the incident electron beam is absorbed by the dielectric film and most of the beam penetrates practically the whole thickness of the dielectric material. Beyond this point, a further increase in beam energy produces a reduction in the conduction effect since an increasing number of the beam of electrons pass completely through the dielectric film at such high velocity that they lose smaller amounts of their energy and consequently tend to free less electrons in the dielectric material.

During tube operation, the electron beam of "reading" gun 30 is caused to constantly scan over the target 40. The secondary electron emission resulting from this bombardment of the exposed insulating surface 44 will raise the potential of surface 44 to approximately the potential of anode 24 which collects this secondary emission. The potential of the signal plate 42 is maintained at approximately 50 volts negative relative to that of the collector electrode 44, by being connected to a source of potential (not shown) through lead 46. Whenever the high velocity electron beam of "writing" gun 20 penetrates the insulating layer 44, a conductive path is immediately set up between the exposed positively charged surface of layer 44 and the negatively charged signal plate 42, at the point of penetration of the high velocity beam. This conductive path permits a flow of electrons from the negative signal plate 42 to the positively charged surface of the layer 44, which discharges the elemental areas of the positive surface of layer 44, at the point of penetration of the high velocity electron beam. In this manner, as the electron beam of "writing" gun 20 scans the target electrode 40, a pattern of negative charges may be laid down, or recorded, in any desired or prearranged design, upon the positive surface of the insulating layer 44. The insulating properties of the layer 44 are such that the negative charge pattern formed upon the exposed surface of the layer 14 will remain almost indefinitely and will not be obliterated by the lateral conduction of the opposite charges.

The negative potential of signal plate 42 causes the areas of insulation 44 penetrated by the "writing" beam of gun 20, to become negative by the conduction effect as described above. This negative potential prevents the collection by these areas of re-distributed secondary electrons from the positive areas scanned by the "reading" beam of gun 30, but not penetrated by the "writing" beam. This negative discharged area can only be recharged by the action of the "reading" beam which also produces the desired signal or, in other words, reproduces the recorded signal. In contrast, conventionally operated tubes have a signal pattern on the target surface represented by elemental areas more positive than areas scanned by only the "reading" beam. In such tubes, signal areas will collect the redistributed secondary electrons and be charged up by this non-signal producing mechanism and thereby lose storage time.

After a negative signal has been traced upon the exposed surface of film 44 of the tube of Figure 1, the negative trace is discharged by the scanning of "reading" beam of gun 30 over the target surface. Each scanning of the target, by the beam of gun 30, will instantaneously raise the potential of a negative elemental area by secondary emission to a certain amount depending upon the size of the beam current and on the surface potential of the target area. As each negative elemental area of the target surface 44 is shifted in a positive direction by the scanning beam of gun 30, a signal pulse will be generated due to the capacity effect maintained between the exposed surface of film 44 and the signal plate 42. These signal pulses may be amplified by an external circuit connected to target 40 through terminal 48 and connector 46. The amplified signals may be reproduced in a television receiver tube, whose beam scanning is synchronized with that of the iconoscope type reading gun 30.

In the operation of the tube, the low velocity beam of "reading" gun 30 may be sufficiently small that the negative signal on the surface of film 44 is not discharged immediately on the first scansion, and, if desired, the signal may be maintained on the target surface for a period of some three minutes comprising approximately 5400 scansions of the target. A small negative signal put down on the target surface 44 by the electron gun 20, will be discharged by the beam of gun 30 before a larger signal is discharged. However, large signals put down on the target will discharge the target surface of film 44 negatively only to the potential of the signal plate 42. Larger signals than this will not produce any larger outgoing signal.

Several dielectric or insulating materials have been found to be appropriate for use as the insulating film 44 of target 40. These materials have displayed the property of becoming instantaneously conductive under bombardment by a high velocity electron beam at the point of impact of the beam. One excellent material is a silica film or layer, formed by heating ethyl silicate vapor to a high temperature, at which it will decompose and precipitate a layer of silica on the conductive support member. Another excellent material for this type of target surface is magnesium fluoride, which can be deposited on a supporting structure by evaporation. Also, aluminum oxide displays the conductive characteristic desired for this type of target. For use in the desired target structure, the insulating film was formed with a thickness of approximately 3000 to 15,000 Angstroms. Insulating magnesium fluoride films of a thickness of approximately 5000 A. have been used in a tube similar to that of Figure 1 and are sufficiently thin that a high velocity electron beam of more than 9000 volts may penetrate the film and produce the desired conducting effect.

The thickness of the dielectric film 44 is determined by the electron velocity of the "writing" beam or the energy of the electrons striking the dielectric surface. As explained above, it is desired that the electron "writing" beam penetrate substantially the thickness of the dielectric film and yet so that maximum absorption of the beam energy by the dielectric film takes place. The penetration of an electron beam into any material can be roughly determined by the Thomson-Whiddington relationship, in which an electron beam penetrating the material, loses energy according to the equation $$X = k(E_0^2 - E_x^2)/d$$

where $E_x$ is the energy in volts of the beam after penetrating any given material through the distance X in centimeters, $k$ is the constant of proportionality, and $d$ the density of the material used in grams per cubic centimeter. If, under ideal conditions the energy of the electrons of the beam is wholly absorbed within the thickness $X_0$ of the dielectric target, which is also the depth of penetration of the beam, then $E_x$ in the above equation would equal zero, and the theoretical value of the dielectric film would be $$x_0 = kE^2/d$$

The value for constant $k$ has been obtained experimentally for materials varying in density from 1.5 to 19 grams/cc. and is found to vary within 10 percent of $2.5 \times 10^{-12}$. Thus, the relationship may also be approximately expressed as:

$$x_0 = (k \pm 0.1k)E_0^2/d$$

where $k = 2.5 \times 10^{-12}$.

There is an optimum "writing" beam voltage for each film thickness at which there is maximum absorption of beam energy by the dielectric film 44. From the above relationship, the approximate value for the thickness of the dielectric film 44 can be determined at any given beam voltage to provide the conductive effect. If the dielectric layer 44 is formed with a thickness approximately this value, good results will be obtained. Since about 80 percent of beam energy is absorbed in the first half of the film depth penetrated by the beam, the optimum "writing" beam voltage is found to be some thirty percent more than the value of $E_0$ in the above relationship.

In a successfully operated tube, similar to that of Figure 1, and having a dielectric target film of magnesium fluoride corresponding to 44 of Figure 1, the optimum operating voltage of the "writing" beam was 9000 volts for a film thickness of 5000 Angstrom units. Also for this thickness of the magnesium fluoride film, measurements were obtained for various other values of the "writing" beam voltage. A poor output signal was obtained for "writing" beam voltages between 4000 and 6000 volts; while for voltages above 6000 volts, the output signal progressively improved from a good signal to the optimum value at 9000 volts. With a "writing" beam voltage greater than 9000 volts, the signal value decreased in value although good response was obtained for voltages up to 15,000, and then changed to a poor signal between this value and 20,000 volts for the "writing" beam.

From the above Thomson-Whiddington relationship the ratio $x_0/E_0^2$ or the depth of penetration of the beam to the square of the beam voltage is constant for a given material. For the above described conditions, if the voltage E of the "writing" beam 20 is expressed in kilovolts and if S is considered as a thickness of the magnesium fluoride screen 44 expressed in Angstrom units, then a series of values of $S/E^2$ can be obtained. That is, for the optimum signal response at $S=x_0$ the ratio $S/E^2$ is approximately 60; for a good signal response such as in the voltage range between 6 kv. and 15 kv., for a 5000 A. thick film the ratio $S/E^2$ will fall approximately within the range from 140 to 20 respectively; and for the voltage range between 4 kv. and 20 kv., which includes signal responses varying from poor to optimum, the ratio $S/E^2$ will fall approximately between 300 and 12.5 respectively. These values of $S/E^2$ also hold true for other materials, if each value is multiplied by the factor $d_1/d_2$ where $d_1$ is the density of the magnesium fluoride and $d_2$ the density of the other material.

Thus, it is clear that the thickness of film 44 is not critical and that targets having dielectric films varying in thickness from one half to twice the valve of $x_0$, expressed above in the Thomson-Whiddington relationship, will produce the conduction effect and a resulting signal response to varying degrees. Thus, the thickness S of film 44 may vary between 0.5 $kE^2/d$ and 2 $kE^2/d$ to provide a signal response, resulting from the conduction effect produced in the film 44 of density $d$ by a "writing" beam of energy E.

Another factor determining the thickness of the dielectric layer 44 is the breakdown voltage of the material used. As described above, the "reading" beam of gun 30 raised the potential of surface 44 to approximately that of collector 24 which is 50 volts positive relative to the potential of signal plate 42. Since the thickness of film 44 is approximately 5000 Angstrom units, at this potential, the voltage gradient across film 44 is around a million volts per centimeter. A film of silica of around 5000 A. will start to break down at a surface potential of 75 volts. However, if the breakdown voltage of the dielectric film is less than collector potential, the "reading" beam of gun 30 will charge surface 44 only up to this breakdown voltage. As the "reading" beam 30 scans the dielectric surface 44, the secondary emission collection ratio, and therefore, the output signal increases with decreasing potential of the dielectric surface relative to collector potential. Figure 6 discloses the changes in secondary emission collection or signal value in relation to changes in the potential of surface 44 relative to the potential of collector 24. Since the secondary emission collection tends to saturate at relatively weak fields, the curve of Figure 6 levels off as the potential of surface 44 falls more than 10 volts below collector potential. Thus, if the target 40 is operated so that the potential of surface 44 is between 10 and 50 volts below collector potential, the signal value produced by the emission of secondaries on each scan of the "reading" beam remains relatively constant. Within this voltage range of surface potential, the signal is independent of surface potential and so produces a "black and white" picture, i.e. the signal is either at its maximum or is not present. If target 40 is operated so that the potential of surface 44 between collector potential and 10 volts below collector potential, as shown in Figure 6, the output signal will vary with changes in the surface potential of dielectric 44. Within this voltage range of surface, the picture produced will have shading varying from white to black. This may be referred to as "half tone" reproduction. Varying the thickness of film 44 will vary the factor of half tone reproduction. If the film 44 is so thin that the breakdown voltage is 10 volts or less, or if the surface potential of film 44 is kept at less than 10 volts, for any other reason, the signal reproduction will only be half tone. On the other hand, a thick layer can take a large voltage and the signal will also be black and white.

The choice of film thickness will, therefore, be determined by the desired ratio of half tone to black and white and by the penetration limitations. The 5000 A. thickness of the magnesium fluoride screen 44 is sufficient to safely sustain surface potentials up to the potential of collector 24 or to 50 volts positive relative to the potential of the signal plate 42.

The density of the dielectric material used will also determine the optimum thickness of the dielectric layer. The greater the density of the material, the thinner the dielectric film must be, for a given operating potential of the high velocity electron beam, since the penetration of the electron beam is inversely proportional to the density of the dielectric material. It is also desirable that the thickness of the film be sufficient to completely absorb the electrons of the high velocity beam. Yet, greater sensitivity is obtained the thinner the target film 44 is, as a proportionately larger charge per elemental area may be obtained on the exposed surface of film 44 for a given fixed voltage of the signal plate 42. It is also highly desirable that the dielectric material used normally be a complete insulator except when under bombardment of the high velocity electron beam. A target comprising a silica layer precipitated from ethyl silicate, as described above, under normal conditions, provides excellent insulation. A signal put down on such a silica target surface by the high velocity beam has been found to remain for a period of 10 days, if no attempt is made to discharge the target surface. Yet, as described above, such a silica layer exhibits the effect of being conductive instantaneously under bombardment of a high velocity beam.

The target 40 of Figure 1 is shown in enlarged detail in Figure 3. Such a target is formed simply by using a heavy metal support plate 42 upon which is deposited, by any desired process, the thin dielectric film 44. One successfully operated target electrode uses a Nichrome metal plate 42 upon which is evaporated a thin dielectric film 44 of silica.

In Figure 1, the design of the bulb envelope 10 is not critical and is largely determined by the requirements of the cathode ray guns. The design of Figure 1 is one of which the circuit requirements are simplified by mounting the "writing" gun 20 perpendicular to the target 40. This arrangement avoids keystone correction for a radial deflection pattern of gun 20. Since the keystone correction has been solved very simply for a television pickup tube, the "reading" gun 30 is mounted off the axis of the tube 10 at the same angle as is used for standard iconoscope pickup tubes. However, the bulb 10 may be made symmetrical and somewhat smaller without complicating the circuits. In this design, guns 20 and 30 are mounted symmetrically at an angle to the axis of the tubular envelope 10 and the target 40 is mounted perpendicular to the axis of the "writing" gun 20. The dimensions of the bulb 10 are determined by the space requirements of the deflection yoke 26 and 38, by the deflection angles required for obtaining resolution, and by the desired target dimensions. Also, if desirable, a tube similar to that of Figure 1 may be designed with all electrostatic focus and deflection.

Figure 4 discloses a storage tube, utilizing the invention, in which there is indicated with a prime number tube elements corresponding to identical structures disclosed in Figure 1. In this tube of Figure 4 the "writing" gun 20' is mounted on the opposite side of the target electrode 50 from the "reading" gun 30'. In a tube of this design, the target electrode 50 is of a different construction than that of the target 40 of Figure 1. Target 50 comprises essentially a dielectric film 52 which also displays the conduction effect when struck by the high velocity electron beam of gun 20'. A very thin metallic film 54 is coated on one side of the dielectric film 52 and provides the signal plate of the target. The detail structure of target 50 is described below. In Figure 4, the target may be supported within the envelope 10' by a mounting ring 58.

The operation of the tube of Figure 4 is very similar to that of Figure 1. An electron beam from the "writing" gun 20' is caused to strike the target electrode 50 at an energy of approximately 10,000 volts. The electron velocity of this beam is sufficient to penetrate the metallic film 54 and most of the thickness of the dielectric film 52. The exposed surface of the dielectric film 52 facing gun 30' is constantly scanned by a relatively low velocity electron beam from the "reading" gun 30'. The electron beam of the "reading" gun 30' is caused to strike the dielectric surface 52 at a potential of approximately 1,000 volts. At this potential the electron beam of gun 30' is between the first and second cross-over potentials for the dielectric surface 52 so that secondary electron emission from the dielectric film 52 leaves the exposed surface of the film positively charged as it is scanned by the "reading" beam of gun 30'. A potential difference of approximately 50 volts is established during tube operation between the signal plate 54 and the collector electrode 24'. As the exposed dielectric surface 52 is scanned by the "reading" gun 30' it will be raised to a potential approximately that of the collector electrode 24'.

Incoming signals such as from a radar receiver are applied to the control grid 18' of the "writing" gun 20'. As the beam of gun 20' scans the target 50, these radar signals are put down as a negative charge pattern on the exposed surface of the dielectric 52 by the high velocity beam of gun 20' which, by the conduction effect described above, will bring the exposed areas of the dielectric surface 52 to the potential of the negative signal plate 54. Signal pulses are capacitively generated in the signal plate circuit as the "reading" beam of gun 30' scans the exposed target surface 52. Thus, the tube functions as a recorder and a reproducer of signal pulses which may be amplified and visibly reproduced in a television kinescope tube as is well known in the art.

To operate effectively, the dielectric film 52 must have a thickness of between 3,000 to 15,000 Angstrom units. Since, however, films of such thickness are not normally self supporting it is necessary that the film of insulating material be formed upon a supporting structure.

A preferred form of screen construction is that disclosed in Figure 5, in which a self supporting fine mesh screen 56 is used as a support for the target films. Screen 56 may be made of copper and have approximately 500 meshes to the inch. To form the film 52 upon such a screen, a thin film of collodion may be stretched across the surface of the wire mesh 56, after which a thin layer 54 of aluminum metal is evaporated to a thickness of 1000 A. onto the collodion surface after which a thin layer 52 of magnesium fluoride of approximately 5000 A. is evaporated upon the surface of the aluminum layer 16. The collodion serves only as a temporary base or support during the formation of these target layers and will disappear during the high temperature bake out of the tube. The target thus formed may be mounted within the tube in any manner of support, as for example, by a metal or glass ring 58. One advantage in using a magnesium fluoride film 52, for the insulating target surface, is that it is easily laid down by the process of evaporation. The formation of a silica film by the decomposition of ethyl silicate vapor, involves excessively high temperatures, which are above the melting point of aluminum and close to the melting point of copper. A successful target of the desired type may use a high resistance glass for the insulating layer 52. Such a target may be formed by stretching a very thin diaphragm of high resistance glass across a heavy support ring and then coating the glass on one side with evaporated aluminum to form the signal plate. The thickness of the glass is around 15,000 A.

If a target similar to that disclosed in Figure 5 is used, the energy of the beam of gun 20' must be sufficient to penetrate not only film 52 but also the metal of the signal plate layer 54. A 10,000 volt beam has been found to be adequate in a successfully operated tube of this type to penetrate a magnesium fluoride dielectric layer of approximately 5000 A. and the metallic signal plate film of a thickness of 1000 A. The electrons striking the mesh are wholly absorbed by the screen and are lost to tube operation so that a mesh is chosen that has as high a transmission as possible. In this case, mesh screen 56 is chosen with approximately 60 percent transmission.

This newly observed conductive effect, makes possible an improvement in the operation of such storage tubes described. The stability in operation of such tubes is improved by establishing a new type of equilibrium potential on an insulating target surface bombarded by an electron beam. The equilibrium potential is, namely, that of the metal signal plate which is in contact with the dielectric insulating target layer. In targets formerly used with storage tubes, and which are non-conductive in operation, the surface potential is determined by the secondary electron emission only. However, with a conductive target, as disclosed, it is possible to completely discharge elemental areas on the target surface to a definite potential determined by the desired voltage placed upon the signal plate of the target.

Another advantage of the conductive effect of non-crystalline dielectric films, used in the described manner as the target electrode of a storage tube, is the ability to use a small "writing" beam to put down the negative signal pattern. This is possible because the conduction current, which produces the stored signal, can be many times larger than the beam current. A small beam current can be focused to a much smaller spot and results in better resolution in the charge pattern.

Another advantage of this conductive effect is to permit the action of two different electron beams in the insulating surface at the same instant and provide a new and stable means for obtaining a different type of response of the insulator to the beams based on this velocity of differences.

While certain specific embodiments have been illustrated and described, it will be understood that various changes and modifications may be made therein without departing from the spirit and scope of the invention.

What is claimed is:

1. For a cathode ray tube, a target electrode comprising a sheet of normally insulating magnesium fluoride material having two oppositely disposed surfaces thereof, a conductive signal plate in contact with one of said surfaces, said magnesium fluoride having a thickness between said surfaces of approximately 5000 A., said magnesium fluoride material having the property of being electrically conductive between said surfaces at the point of impact of an electron beam striking one of said surfaces at electron velocities above a predetermined value.

2. A cathode ray tube comprising, an envelope, a target electrode including a sheet of normally insulating material mounted within said envelope, said insulating sheet having between two opposite surfaces thereof a density and thickness of material pervious to electrons having velocities above a predetermined value, means for directing electrons having velocities below said predetermined value at one of said target surfaces to charge said one surface to a potential during tube operation, a metal film deposited on the other of said opposite target surfaces to maintain said other surface at a fixed potential different than that of said one target surface, said insulating target material having the property of being electrically conductive when struck by electrons having velocities above said predetermined value, means for directing electrons having velocities greater than said predetermined value at one of said target surfaces to establish an electrically conductive path between said target surfaces.

3. A cathode ray tube comprising, an evacuated envelope, a target electrode including a sheet of normally insulating material mounted within said envelope, said insulating sheet having between two opposite surfaces thereof a density and thickness of material pervious to electrons having velocities above a predetermined value, an electron gun within said envelope for directing electrons having velocities below said predetermined value at one of said target surfaces to charge said one surface to a potential during tube operation, a metal signal plate in contact with the other surface of said insulating target to maintain said other surface at a fixed potential different than that of said opposite surface, said insulating target material having the property of being electrically conductive when struck by electrons having velocities above said predetermined value, a second electron gun within said envelope for directing electrons having velocities greater than said predetermined value at one of said target surfaces to establish an electrically conductive path between said opposite target surfaces.

4. A cathode ray tube comprising an envelope, means within said envelope for forming along a path an electron beam having a predetermined energy, a target electrode within said envelope including a sheet of electrically insulating material which possesses the property of becoming an electrical conductor when bombarded with electrons, said insulating material having two spaced surfaces transverse to said beam path, means within said envelope and including said electron beam forming means for establishing a difference of potential between said spaced surfaces, the distance between said spaced surfaces being approximately equal to the ratio of the square of the energy of said electron beam to the density of the insulating material multiplied by $(k \pm 0.1k)$, where $k$ equals $2.5 \times 10^{-12}$.

5. A cathode ray tube comprising an envelope, means within said envelope for forming along a path an electron beam having a predetermined energy, a target electrode including a sheet of normally electrically insulating material which possesses the property of becoming an electrical conductor when bombarded with electrons, said insulating material having two opposed surfaces mounted within said envelope transverse to said beam path, a metal signal plate in contact with one of said surfaces to maintain said surface at a fixed potential during tube operation, means within said envelope for maintaining the other insulating surface at a different potential than that of said one surface, the distance between said target surfaces being approximately equal to the ratio of the square of the energy of said electron beam to the density of the insulating material multiplied by a range of values from $0.5k$ to $2k$, where $k$ equals $2.5 \times 10^{-12}$.

6. A target for an electron discharge tube, said target comprising a layer of electrically insulating material which possesses the property of becoming an electrical conductor when bombarded with electrons, said layer having a thickness pervious to electrons having energies above a predetermined value, the thickness of said insulation layer being approximately equal to the ratio of the square of the electron energy of said predetermined value to the density of the insulation material multiplied by $(k \pm 0.1k)$, where $k$ equals $2.5 \times 10^{-12}$.

7. For a cathode ray tube, a target electrode comprising a sheet of normally insulating magnesium fluoride material having two oppositely disposed surfaces thereof, said magnesium fluoride sheet having a thickness pervious to electrons having energies above a predetermined value, a conductive signal plate in contact with one of said surfaces, the thickness of said magnesium fluoride sheet being approximately equal to the ratio of the square of the predetermined electron energy to the density of the magnesium fluoride material multiplied values from 0.5 to $2k$, where $k$ equals $2.5 \times 10^{-12}$.

8. A target for an electron discharge tube, said target comprising a layer of electrically insulating material which possesses the property of becoming an electrical conductor when bombarded with electrons, said layer having a thickness determined by an electron beam having an energy of a predetermined value, the ratio of the thickness of said layer, expressed in Angstrom units, to the square of the electron beam energy of said predetermined value, expressed in kilovolts, being equal to a range of values between 12.5 and 300.

9. For a cathode ray tube, a target electrode comprising a sheet of normally insulating magnesium fluoride material having two oppositely disposed surfaces thereof, said magnesium fluoride sheet having a thickness determined by an electron beam having an energy of predetermined value, a conductive signal plate in contact with one of said surfaces, the ratio of the thickness of said magnesium fluoride sheet expressed in Angstrom units to the square of the predetermined beam electron energy expressed in kilovolts being equal to a range of values between 20 and 140.

10. A cathode ray tube comprising an envelope, means within said envelope for forming along a path an electron beam having a predetermined energy, a target electrode within said envelope including a sheet of electrically insulating material which possesses the property of becoming an electrical conductor when bombarded with electrons, said insulating material having two spaced surfaces transverse to said beam path, means within said envelope for establishing a difference of potential between said spaced surfaces expressed in Angstrom units to the square of the energy of said electron beam expressed in kilovolts being equal to a range of values between 12.5 and 300.

11. A cathode ray tube comprising an envelope, means within said envelope for forming along a path an electron beam having a predetermined energy, a target electrode including a sheet of normally electrically insulating material which possesses the property of becoming an electrical conductor when bombarded with electrons, said insulating material having two opposed surfaces mounted within said envelope transverse to said beam path, a metal film deposed on one of said surfaces, lead means connected to said metallic film for connecting said film to a source of potential to maintain said film at the potential of the potential source, means within said envelope for maintaining the other of said insulating surfaces at a potential different than that maintained on said metal film, the ratio of the distance between said target surfaces expressed in Angstrom units to the square of the energy of said electron beam expressed in kilovolts being equal to a range of values between 20 and 140.

12. A cathode ray tube comprising an envelope, means within said envelope for forming along a path an electron beam having a predetermined energy, a target electrode including a sheet of magnesium fluoride material having two opposed surfaces, said target electrode mounted within said envelope transverse to said beam path, means for directing electrons having velocities below said predetermined value at one said target surface to charge said surface to a potential during tube operation, a metal film deposited on the other of said opposite target surfaces to maintain said other surface at a fixed potential different than that of said one target surface, the ratio of the distance between said target surfaces expressed in Angstrom units to the square of the energy of said electron beam expressed in kilovolts being equal to approximately 60.

13. A recorder and reproducer of signals comprising a target for electrons including a layer of electrically insulating material which possesses the property of becoming an electrical conductor when bombarded with electrons, an electrode member adjacent said target, electric circuit means for applying between said layer and said electrode a signal voltage to be stored, means for forming a beam of electrons and for causing it to strike said layer as said signals are being applied thereto, thereby forming a series of charges on said layer, and means for removing said charges at a later time to control the production of signals.

14. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, and electric circuit means for applying a signal voltage to be stored between said coating and said electrode member.

15. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, electric circuit means for applying a signal voltage to be stored between said coating and said electrode member, said layer being capable of transmitting electrons, and means for forming a beam of electrons and for directing it through said layer.

16. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, and electric circuit means for applying a signal voltage to be stored between said coating and said electrode member, said circuit means including a biasing source of potential.

17. A device for the storage of electrical signals comprising a target for electrons including material which is normally electrically insulating but which has the property of becoming electrically conducting when bombarded with electrons, a metallic member on one face of said target, a second member adjacent the opposite face of said target but spaced therefrom, electric circuit means for applying a signal voltage to be stored between said two members, and means for scanning said target with a beam of electrons.

18. A device for the storage of electrical signals comprising a target for electrons including material which is normally electrically insulating but which has the property of becoming electrically conducting when bombarded with electrons, a metallic member on one face of said target, a second member adjacent the opposite face of said target but spaced therefrom, electric circuit means for applying a signal voltage to be stored between said two members, and means for scanning said target with a beam of electrons, said last-mentioned means being so aligned with respect to said target that it passes through said spaced conducting member to strike said target.

19. A device for the storage of electrical signals comprising a target for electrons including material which is normally electrically insulating but which has the property of becoming electrically conducting when bombarded with electrons, a metallic member on one face of said target, a second member adjacent the opposite face of said target but spaced therefrom, electric circuit means for applying a signal voltage to be stored between said two members, and means for scanning said target with a beam of electrons, said last-mentioned means being so aligned with respect to said target that the beam passes through said member on said target to strike said material.

20. A device for the storage of electrical signals comprising a target for electrons including material which is normally electrically insulating but which has the property of becoming electrically conducting when bombarded with electrons, and means including a source of direct potential for applying a signal voltage to be stored between two respectively opposite surfaces of said material.

21. A device for the storage of electrical signals comprising a target for electrons including material which is normally electrically insulating but which has the property of becoming electrically conducting when bombarded with electrons, electric circuit means for applying a signal voltage to be stored between two respectively opposite surfaces of said material, and means separate from said signal applying means for scanning said target with a beam of electrons.

22. A device for the storage of electrical signals comprising a target for electrons including a layer of electrically insulating material which has the property of becoming electrically conducting when bombarded with electrons, means including a source of direct potential for applying a voltage across said layer, and means for scanning said layer with a modulated beam of electrons.

23. A recorder and reproducer of signals comprising a target for electrons including a layer of an electrical insulator which possesses the property of becoming an electrical conductor when bombarded with electrons, electric circuit means for applying a signal to be stored to said layer, means for forming a beam of electrons and for causing it to strike said target as said signals are being applied thereto, thereby trapping a charge in said target proportional to the intensity of the signal, and means for utilizing said trapped charge at a later time to control the production of signals.

24. A tube for the storage of electrical signals comprising a target for electrons including material which is normally electrically insulating but which has the property of becoming electrically conducting when bombarded with electrons, electric circuit means for applying a voltage between two respectively opposite surfaces of said material, and means separate from said electric circuit means for scanning said target with a modulated beam of electrons.

25. An electron tube comprising means for generating a beam of electrons having a predetermined velocity and a target positioned to have one side thereof impinged by said beam, said target comprising a thin layer of an electrical insulating material which has the property of becoming conducting when bombarded by electrons at velocities greater than said predetermined velocity, and a continuous metallic coating on said layer on the side thereof toward said beam generating means.

References Cited in the file of this patent

UNITED STATES PATENTS 2,537,388    Woolridge _____ Jan. 9, 1951

FOREIGN PATENTS 883,415    France _____ Mar. 22, 1943